Dec. 29, 1936.  J. F. JOY  2,065,809
KERF CUTTING APPARATUS
Filed Aug. 12, 1935  4 Sheets-Sheet 1
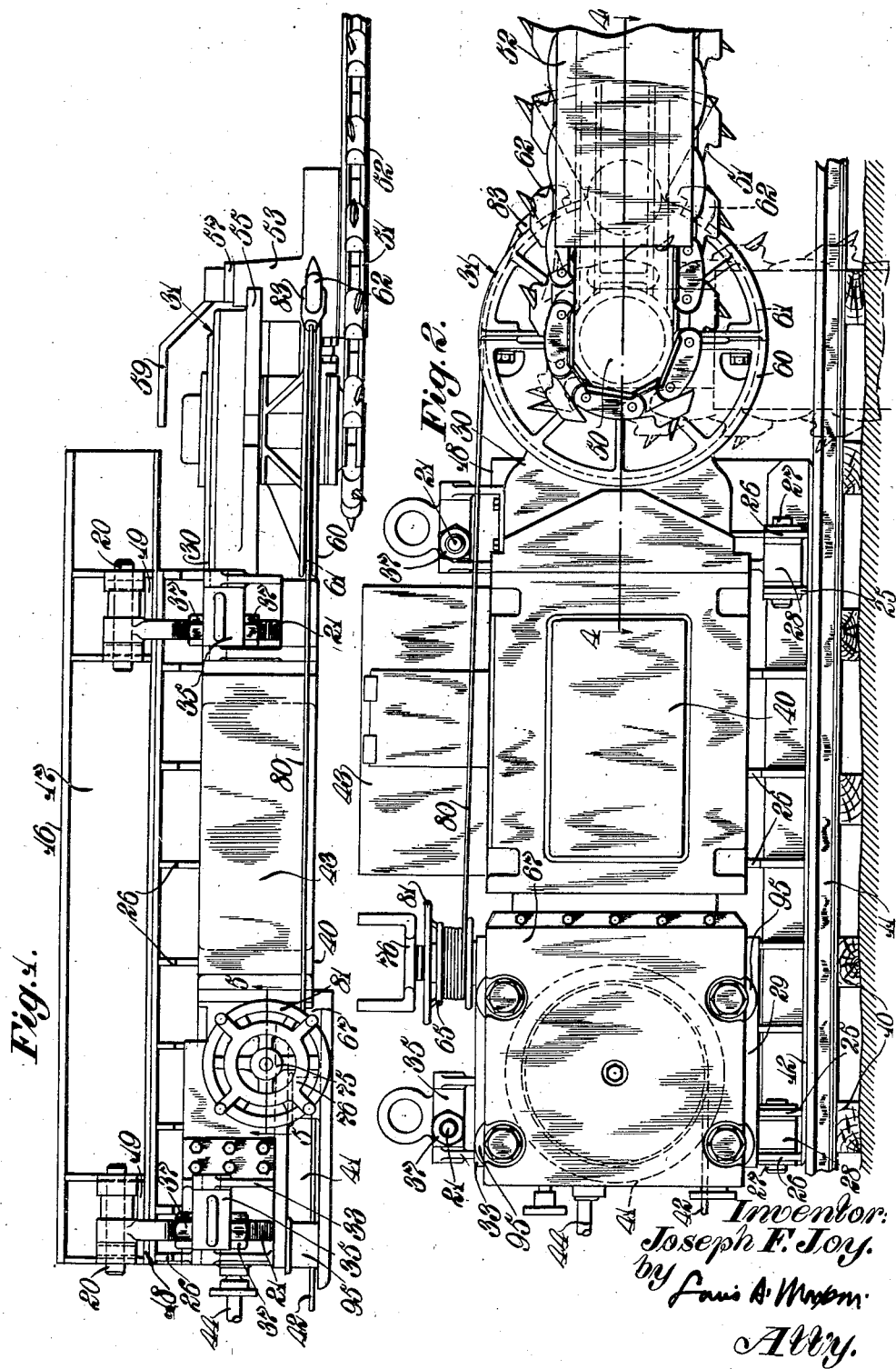
Inventor:
Joseph F. Joy.
by Louis A. Moxon
Atty.

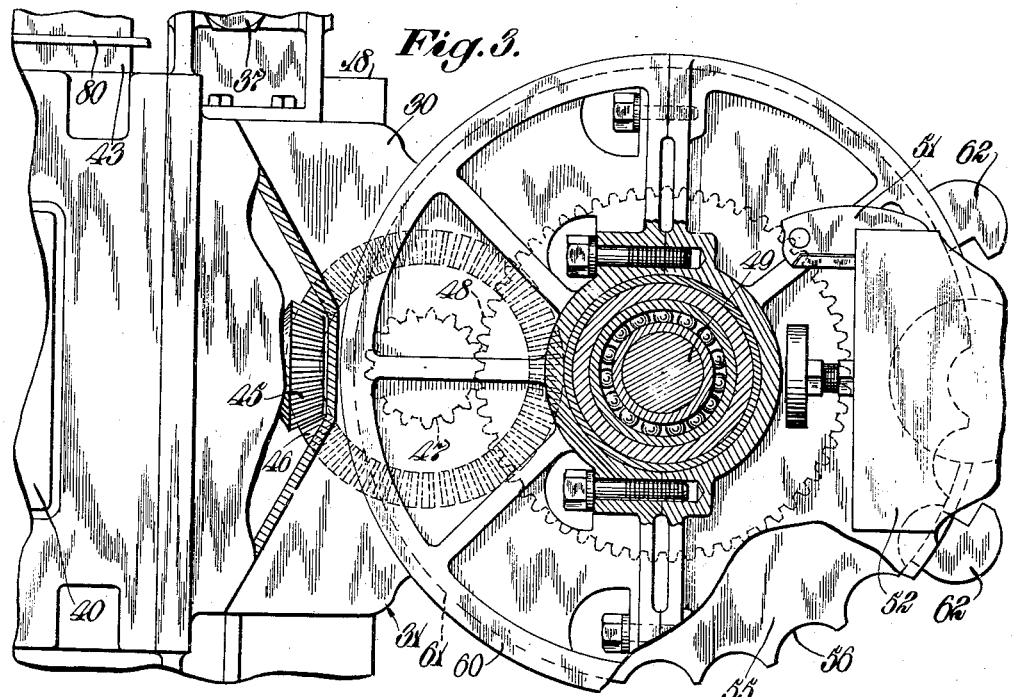
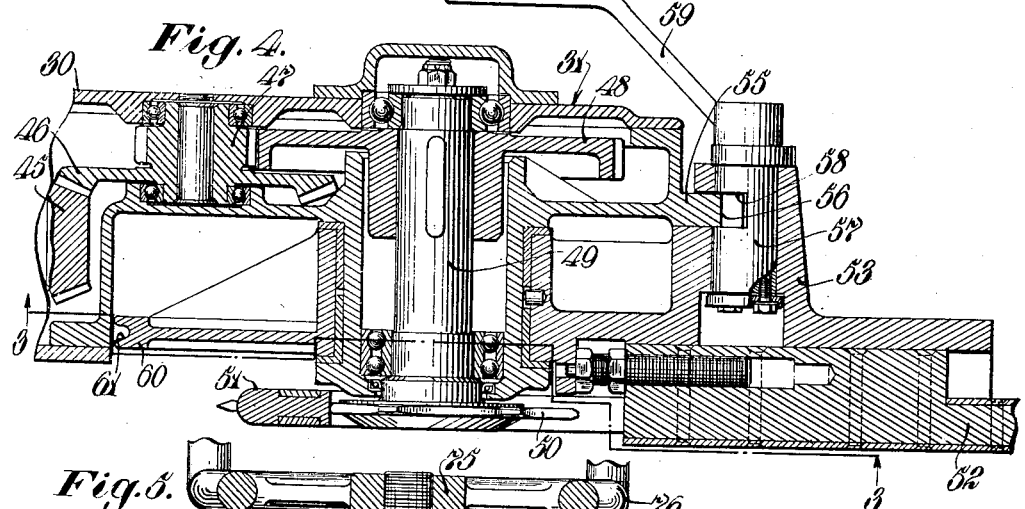
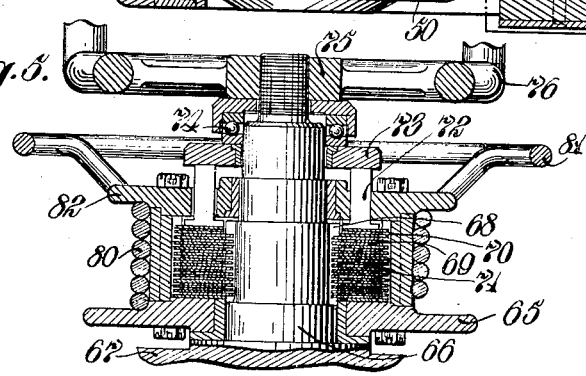

Dec. 29, 1936.  J. F. JOY  2,065,809
KERF CUTTING APPARATUS
Filed Aug. 12, 1935   4 Sheets-Sheet 3
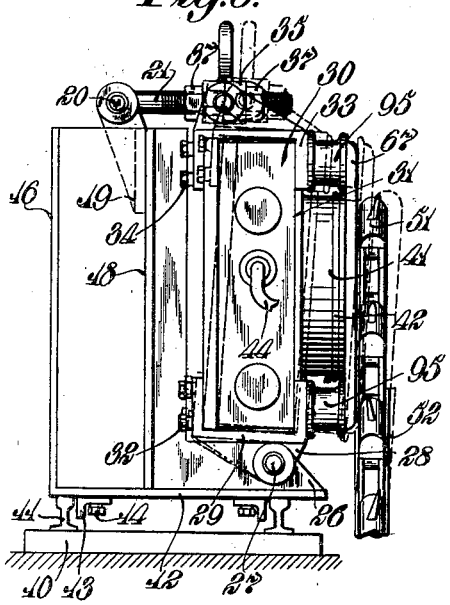
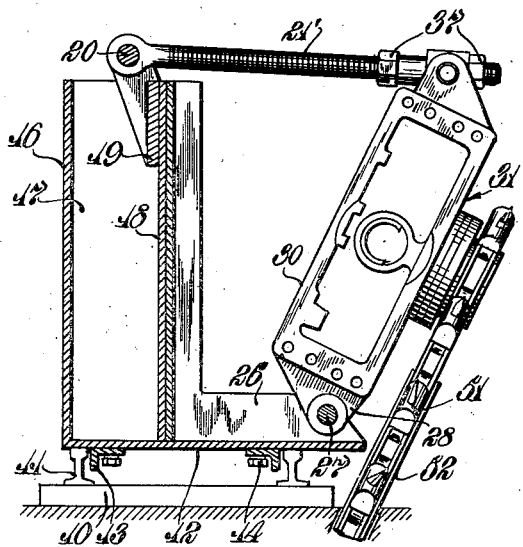
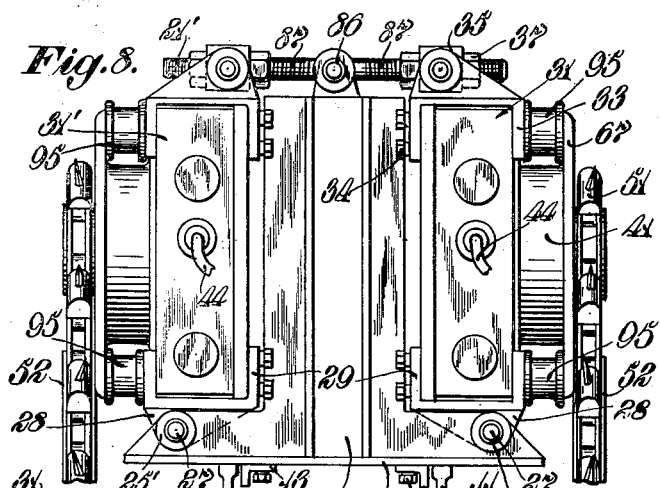
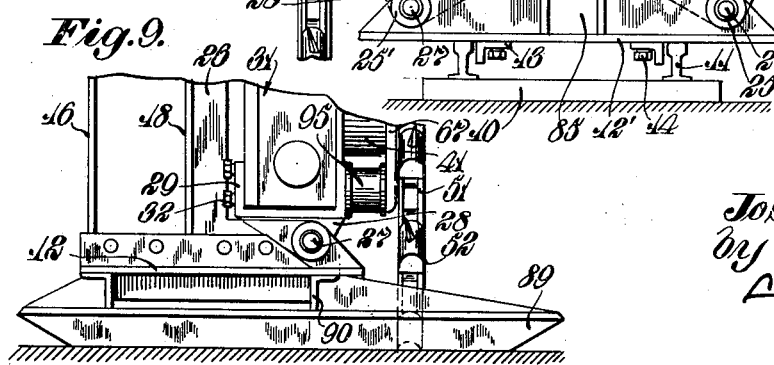
Inventor:
Joseph F. Joy.

Dec. 29, 1936.　　　　J. F. JOY　　　　2,065,809
KERF CUTTING APPARATUS
Filed Aug. 12, 1935　　　　4 Sheets-Sheet 4

Inventor:
Joseph F. Joy.
by
Atty.

Patented Dec. 29, 1936

2,065,809

UNITED STATES PATENT OFFICE 2,065,809

KERF CUTTING APPARATUS

Joseph F. Joy, Claremont, N. H., assignor to Sullivan Machinery Company, a corporation of Massachusetts Application August 12, 1935, Serial No. 35,829

20 Claims. (Cl. 262—28)

My invention relates to kerf cutting apparatus, and more particularly to kerf cutting apparatus particularly adapted for the formation of vertical or inclined kerfs in the material over which the apparatus is movable during cutting.

The method of strip pit mining is well known, and the fact that coal from which the overburden has been removed is taken up by a process embodying the cutting of spaced vertical kerfs and the taking up of the coal which has been cut free laterally from the solid body by the kerfs mentioned, is widely known. It is also possible in other fields of use, as for example in tunneling, trenching and the like, where the material can be cut by chain type kerf cutters or saws, to form channels or V-shaped trenches and thereby facilitate the desired operations. Projects on which this general method is useful would be in deepening tunnels, in cutting trenches for pipes, in forming canals for water, etc.

It is an object of my invention to provide an improved kerf cutting mechanism. It is another object of my invention to provide an improved kerf cutting mechanism well adapted for the purposes above enumerated. It is a further object of my invention to provide an improved kerf cutting apparatus capable of readily cutting vertical or inclined kerfs in the material upon which the kerf cutting apparatus is supported. It is a further object of my invention to provide an improved kerf cutting apparatus, either skid-mounted or rail-mounted, for the formation of single or double, vertical or inclined kerfs, depending upon the structure of the mechanism desired. More specifically, it is an object of the invention to provide an improved mining apparatus capable of cutting free a V-shaped mass of material, and thereby greatly facilitating the formation of trenches. Still another object of my invention is to provide an improved strip pit mining apparatus having improved controlling means and improved kerf-position adjusting means. Yet another object of my invention is to provide an improved kerf cutting apparatus embodying a plurality of relatively adjustable kerf cutting devices. Still another object of the invention is to provide an improved control means for regulating the entry of a pivoted kerf cutting bar on a strip pit machine. Other objects and advantages of the invention will hereinafter more fully appear.

Referring to the drawings, in which an illustrative embodiment and two modifications of the invention are shown for purposes of illustration,—

Fig. 1 is a top plan view of a kerf cutting machine constructed in accordance with one illustrative embodiment of the invention.

Fig. 2 is a side elevation of the machine shown in Fig. 1.

Fig. 3 is an enlarged view, with parts broken away, on section line 3—3 of Fig. 4.

Fig. 4 is a horizontal section on the line 4—4 of Fig. 2.

Fig. 5 is a detail sectional view on the plane of the line 5—5 of Fig. 1.

Fig. 6 is an end view, with parts omitted, of a rail-supported embodiment providing for a relatively narrow range of tilting adjustment.

Fig. 7 is a view, with parts omitted, illustrating a rail-mounted embodiment adapted for a wider range of adjustment, the view being partly in section to facilitate illustration.

Fig. 8 is an end view, with parts omitted, of a plural-cutting-device unit of the rail-mounted type.

Fig. 9 is a fragmentary view showing a skid-mounted modification.

Figure 10:
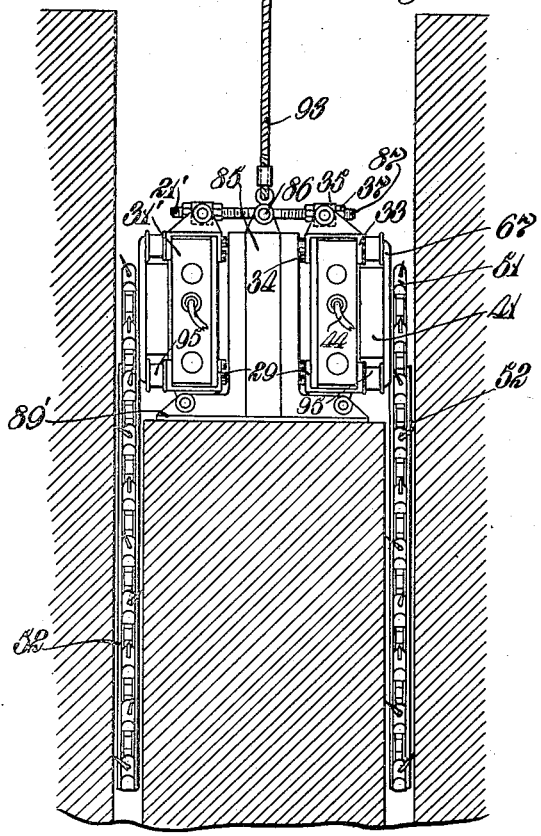
Fig. 10 is a diagrammatic view showing a plural-cutting-device unit mounted on a skid and forming a trench with parallel walls.

Prior to the description of my invention in detail, it should be noted that the same may be embodied, in certain of its aspects, in single-cutting-unit or plural-cutting-unit structures, may be embodied in structures adapted for the cutting of vertical and slightly tilted or vertical and substantially tilted kerfs, and may be mounted in various ways including skid mountings and rail mountings.

In Figs. 1 to 6 inclusive, there is shown a rail-mounted embodiment equipped for the formation of vertical and relatively slightly inclined kerfs, but it will be readily appreciated as the description proceeds that modification to permit the formation of more widely inclined kerfs is a matter of minor change in parts.

Referring to the embodiment disclosed in Figs. 1 to 6, it will be observed that a series of ties 10 support rails 11, upon which a bottom plate 12 is suitably guided by flanges formed by angle irons 13 bolted, as at 14, to the bottom plate. The bottom plate supports, in this single-cutting-unit type of apparatus, a large, herein rectangular, ballast compartment 16 providing an open-top chamber 17 in which scrap iron, rock or other material may be deposited to preclude tilting of the base plate 12 and of the structure supported thereby, upon angling of the cutting apparatus, which will shortly be described. Near the top of the inner wall 18 of the ballast box 16 is mounted suitable support means, herein in the form of a couple of pads 19, providing pivotal supports at 20 for a pair of heavy adjusting and supporting screws 21, whose function will be shortly described. At its side opposite the ballast box 16, the bed plate 12 supports upstanding brackets 25, suitably secured to the bed plate 12; and suitable angle braces 26, of which a number are arranged along the length of the bed frame 12, are secured to the wall 18 of the ballast box and to the bed plate 12 for the purpose of providing abundant rigidity. The brackets 25 and certain of the angle braces 26 support pivot pins 27 which in their turn support pivotally mounted tilting supports 28 providing U-shaped portions 29 adapted to receive the frame 30 of a cutting mechanism 31, shortly to be described, and adapted to be secured to such frame by machine screws 32. Devices 33, similar to the supports 28, are secured, as at 34, to the top of the machine frame 30, and receive the trunnions of tiltable blocks 35 through which the screws 21 extend and with the opposite ends of which adjusting and locking nuts 37 engage.

The cutting apparatus, insofar as its feeding mechanism and driving motor are concerned, may advantageously be of the construction shown in the Letters Patent to Morris P. Holmes No. 1,968,769, but it will be understood that substantially any suitable form of longwall machine may be adapted readily to mounting in place of the illustrated machine 31. It will suffice to say that a motor enclosed within the central part 40 of the machine 31 drives, through suitable gearing, a feed drum 41, from which a flexible connection 42 is led off to a suitable jack or other stationary point, so that as the drum 41 turns, the machine will be moved bodily. Suitable controlling means for the motor may be housed in the casing 43, and current may be supplied to the machine motor through a connection of well known form at 44. The motor has a driving pinion 45, which drives, through beveled gear 46, spur pinion 47, spur gear 48, and drive shaft 49, a cutter chain driving sprocket 50, which drives a cutter chain 51 about the periphery of a pivotally supported cutter bar 52, which bar is supported by a bracket 53 for rotation about the axis of the shaft 49. Coaxial with the shaft 49 there is a plate 55 having a series of locking indentations 56 in its periphery, with which a rotatable locking pin 57, cut away as at 58 to permit bar swing, may be caused to assume an interlocking engagement upon turning of the element 57 by the handle 59. The bar supporting bracket is provided, concentric with the bar, also with a flange 60 terminating in a rope-receiving groove 61, and a pair of hooks 62 is provided adjacent the central longitudinal line of the cutter bar to permit the attachment, for swinging or controlling of swinging of the bar, of flexible connections, as may be desired. Since the weight of the bar is more than sufficient to cause the latter to swing downwardly and cut its way into the coal or other material over which the machine is adapted to be moved, and since it may be desired to control the rate at which the bar cuts its way into this material, I have provided a retarding drum 65 mounted for rotation upon a fixed upstanding stub shaft 66 carried upon the top of the machine feed frame 67. The stub shaft 66 is provided with suitable interlocking connections 68 with the brake discs 69, and within the interior 70 of the drum 65 there is interlockingly secured another series of brake discs 71. Pressure fingers 72, engageable by a loading collar 73 to which pressure may be applied through a ball bearing 74 and a nut 75 having a suitable hand wheel 76 secured thereto, permit retarding or interruption of drum rotation. Manual drum rotation to wind in a flexible rope or cable 80, may be accomplished by the hand wheel 81 rigidly connected with the flange 82 of the drum 65. The flexible member 80 may have a suitable eye, as at 83, formed on the free end thereof, and this may be led forward to and hooked over the upper hook 62 to support the bar in the position of Fig. 2 and, under the control of the brake mechanism described, control the lowering of the bar at any desired rate.

A more detailed description of the cutting mechanism end of the coal cutting machine 31, and any detailed description of the feeding end of the latter other than to state that the same provides for relatively fast and relatively slow moving speeds, slow speed being adapted for effecting cutting and having a wide range of adjustments under the control of the apparatus contained in the feed frame 67—is unnecessary. It will be understood that the screws 21 may be replaced by other screws of greater length, as by the screws 21' shown in Fig. 7, when a greater angle to the vertical for the kerf is desired. It will be noted, moreover, as shown in Fig. 8, that when it is desired to cut a plurality of kerfs at the same time, the bed plate 12' may be extended and may be provided with a relatively narrow upstanding central portion 85 on which pivotal mountings 86 for pairs of oppositely extending adjusting screws 87 may be supported. A plurality of brackets 25, may be arranged at each side and near the corners of the bed plate 12' in this embodiment of the invention, and a plurality of cutting devices 31', 31' may be arranged with one at each side of the center and with their cutter bars 52 outermost upon the bed plate 12'. With such an apparatus, parallel vertical kerfs or kerfs whose bottoms are spaced from each other by various distances, or which may indeed practically intersect, may be formed, and actual intersections of the kerfs may be accomplished if desired, by having the bars at slightly different angles to the vertical, both from front to back and laterally.

Where rail mounting is not equally convenient, skid mountings may be substituted, as shown in Fig. 9, where it will be noted that a suitable skid pan 89 is provided to support the bottom plate 12. As the structure of such skid pans is well known per se, a detailed description is unnecessary, but it will be appreciated that the same should provide a suitable support, as at 90, for the base plate 12.

Figure 11:
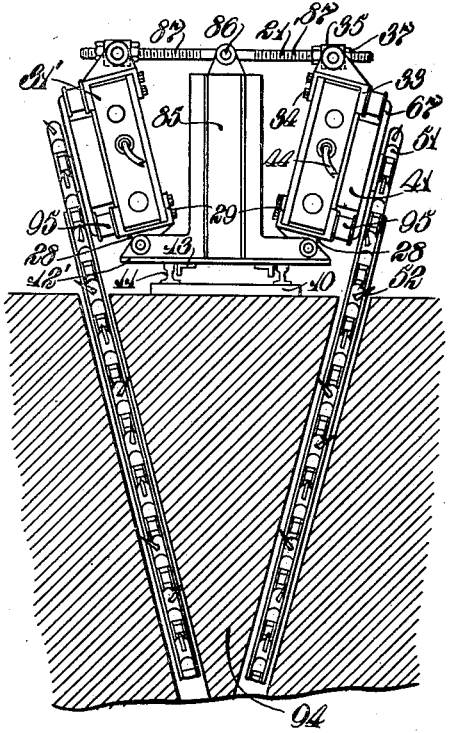
Fig. 11 is a diagrammatic view of a rail-mounted apparatus of the plural-cutting-unit type forming a trench with relatively inclined walls.
Figure 12:
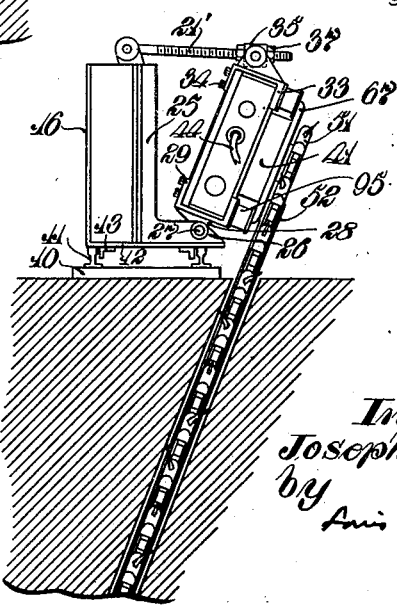
Fig. 12 is a diagrammatic view showing a single-cutting-unit, rail-mounted apparatus cutting an inclined kerf.

The mode of operation of the apparatus will be readily understood from the description which has been given, but reference may be had to the three diagrammatic views, Figs. 10, 11 and 12, for further description. It will be noted in Fig. 10 that the cutting apparatus is shown as of the skid-mounted type; that it is shown in a position to which it has been lowered, as by suitable cable means 93 and a lowering device not shown; that the skid 89' is sliding upon a bottom formed by the taking up of the material between the original pair of spaced cuts; and that the cutter bars 52, at opposite sides of the machine, are cutting spaced parallel kerfs.

In Fig. 11 where a track-mounted machine moving along a track 10, 11 is shown, a double cutting unit provided with longer adjusting screws 21' is shown in the operation of cutting substantially intersecting kerfs. Obviously, the material 94 between these kerfs may be readily removed in large masses and a trench suitable for the reception of drainage pipes of large size may be easily formed.

In Fig. 12 a single unit machine with a long adjusting screw 21' is shown making an inclined kerf, and the material to the left of this kerf may be readily removed by pneumatic hammers or other suitable digging implements, or may be shot up, depending upon the hardness of the material.

In all the forms of the invention it will be understood that the feed cable 42 will be used to draw the machine either along the trackway or, upon a skid 89, directly upon the surface in which the cut is to be made. Suitable guide sheaves 95 are provided, as is usual, on the cutting machine to guide the ropes as necessary, and if it be desired to change the direction or point of draft in a manner which will be readily understood by all who are skilled in the mining machine art, auxiliary sheaves can be provided for the purpose of guiding the feed cable to the point at which it is desired that the draft shall be applied.

It will be noted that in all the forms of my invention there is provided apparatus of a rugged nature, proof against accidental tilting and injury to mechanism or operator; a mechanism in which the angle of the bar to the vertical, both from front to rear and laterally, may be readily controlled; a mechanism having simple and effective means for controlling the rate at which the bar enters the material to be cut; mechanism having a feed rope which can be used to effect not only bodily feeding of the apparatus, but swinging of the cutter bar into the coal if necessary by leading the rope forward to the lower hook 62; mechanism which can be readily moved to provide for the cutting of kerfs at greater or lesser angles to the vertical; and mechanism which can be easily accommodated either to cutting directly on the bottom while supported on the skid, or to movement along suitable guide tracks as indicated in the embodiment of the invention first described.

While I have in this application specifically described one form which the invention may assume in practice, and two modifications of the same, it will be understood that these are shown for purposes of illustration only, and that the invention may be further modified and embodied in various other forms without departing from its spirit or the scope of the appended claims.

What I claim as new and desire to secure by Letters Patent is:

1. In a mining apparatus, a support, a kerf cutting machine supported on said support for tilting movement about an axis extending longitudinally of said support and having a vertical kerf cutter and a motor for operating said kerf cutter to effect cutting and further having a motor-operated rectilinear feed, and means extending between the upper portions of said support and said kerf cutting machine for controlling the angle of kerf.

2. In a mining apparatus, a portable base, a ballast box at one side of said base, a pivotal support at the other side of said base, a kerf cutting mechanism supported on said pivotal support for tilting movement about a longitudinal axis, and means extending between said ballast box and said kerf cutting machine for controlling the angle of the kerf cut to the vertical.

3. In a mining apparatus, a frame adapted for guidance along a trackway, ballast means on one side of said frame, bearing means at the other side of said frame providing a plurality of pivots for tilting movement about an axis extending longitudinally of said frame, and kerf cutting means having a swinging cutter bar supported on said pivots for tilting movement between positions in which said bar lies in vertical planes and in planes oblique to the vertical.

4. In a mining apparatus, a support, a kerf cutting machine pivotally supported on said support upon one edge thereof, said kerf cutting machine having a vertically swingable bar, means extending between the upper portions of said support and said machine for tilting said machine about its pivot relative to said support, and means supported by said kerf cutting machine for retarding downward swinging of said bar including a braking device supported upon the top of said cutting machine and flexibly connected to said bar.

5. In a mining apparatus, a portable base providing a pivot, a kerf cutting machine of the longwall type supported on said pivot for tilting movement about an axis beneath one edge thereof, means for controlling the angle of said kerf cutting machine including a screw, a trunnion carried by the upper part of said kerf cutting machine, a mounting for one end of said screw, and nuts carried by said screw and cooperating with said trunnion.

6. In an apparatus of the character described, a portable base, a plurality of kerf cutting machines supported edgewise on said base near the opposite sides of the latter for tilting movement about axes extending longitudinally of said base, and means for independently controlling the angle of tilt of said kerf cutting machines.

7. In an apparatus of the character described, a portable base, a plurality of kerf cutting machines supported edgewise on said base near the opposite sides of the latter for tilting movement about axes extending longitudinally of said base, and means for independently adjusting the angle of tilt of said kerf cutting machines including a pedestal between said kerf cutting machines providing an abutment upon which said adjusting means reacts.

8. In a mining apparatus, a portable base having an upstanding support, kerf cutting mechanism on said base including a vertical kerf cutter, means for pivotally supporting said kerf cutting mechanism on said base at one side of said upstanding support to tilt about a horizontal axis extending longitudinally of said base, and means extending between the upper portion of said kerf cutting mechanism and the upper portion of said support for tilting said kerf cutting mechanism about its pivotal axis with respect to said base to tilt said kerf cutter relative to the vertical.

9. In a mining apparatus, a portable base having an upstanding support, kerf cutting mechanism on said base including a vertical kerf cutter, means for pivotally supporting said kerf cutting mechanism on said base at one side of said upstanding support to tilt about a horizontal axis extending longitudinally of said base, means extending between the upper portion of said kerf cutting mechanism and the upper portion of said support for tilting said kerf cutting mechanism about its pivotal axis with respect to said base to tilt said kerf cutter relative to the vertical, and means carried by said upstanding support for substantially counter-balancing the weight of said kerf cutting mechanism when the latter is tilted with respect to said base.

10. In a mining apparatus, a portable base having an upstanding support, kerf cutting mechanism on said base including a vertical kerf cutter, means for pivotally supporting said kerf cutting mechanism on said base at one side of said upstanding support to tilt about a horizontal axis extending longitudinally of said base, means extending between the upper portion of said kerf cutting mechanism and the upper portion of said support for tilting said kerf cutting mechanism about its pivotal axis with respect to said base to tilt said kerf cutter relative to the vertical, and means mounted on said kerf cutting mechanism to tilt therewith for bodily moving the entire apparatus to feed said kerf cutter.

11. In a mining apparatus, a portable base having an upstanding support, a longwall mining machine having a pivoted cutter bar swingable in vertical planes about a horizontal axis, means for pivotally supporting said mining machine on said base at one side of said upstanding support to tilt about a horizontal axis extending longitudinally of said base, and means extending between the upper portion of said mining machine and the upper portion of said upstanding support for tilting said mining machine about its pivotal axis with respect to said base to tilt said cutter bar relative to the vertical.

12. In a mining apparatus, a portable base having an upstanding support, a longwall mining machine having a pivoted cutter bar swingable in vertical planes about a horizontal axis, means for pivotally supporting said mining machine on said base at one side of said upstanding support to tilt about a horizontal axis extending longitudinally of said base, means extending between the upper portion of said mining machine and the upper portion of said upstanding support for tilting said mining machine about its pivotal axis with respect to said base to tilt said cutter bar relative to the vertical, and means carried by said upstanding support for substantially counter-balancing the weight of said mining machine when the latter is tilted with respect to said base.

13. In a mining apparatus, a portable base, a pair of kerf cutting mechanisms mounted on said base, each having a vertical kerf cutter, means for pivotally supporting said cutting mechanisms on said base to tilt about horizontal axes extending longitudinally of said base, and means for tilting said cutting mechanisms about their respective pivotal axes relative to said base to tilt said kerf cutters with respect to the vertical.

14. In a mining apparatus, a portable base, a pair of kerf cutting mechanisms mounted on said base each having a vertical kerf cutter, means for pivotally supporting said cutting mechanisms on said base to tilt about horizontal axes extending longitudinally of said base, and means for independently tilting said cutting mechanisms about their respective pivotal axes relative to said base to tilt said kerf cutters with respect to the vertical.

15. In a mining apparatus, a portable base, a pair of kerf cutting mechanisms mounted on said base each having a vertical kerf cutter, means for pivotally supporting said cutting mechanisms on said base to tilt about horizontal axes extending longitudinally of said base in parallel relation at opposite sides of said base, and means for tilting said cutting mechanisms about their respective pivotal axes relative to said base to tilt said kerf cutters with respect to the vertical.

16. In a mining apparatus, a portable base, a pair of kerf cutting machines each having a vertical kerf cutter, means for pivotally supporting said cutting machines on said base on horizontal axes extending longitudinally of said base, and means for swinging said cutting machines about their respective pivotal axes relative to said base to tilt said kerf cutters with respect to the vertical.

17. In a mining apparatus, a portable base having an upstanding support located centrally between the sides thereof, a pair of kerf cutting mechanisms mounted on said base one on each side of said support, each cutting mechanism having a vertical kerf cutter, means for pivotally supporting said cutting mechanisms on said base on horizontal axes extending longitudinally of said base, and means connected to said support for tilting said cutting mechanisms about their respective pivotal axes relative to said base to tilt said kerf cutters with respect to the vertical.

18. In a mining apparatus, a portable base adapted to move along a trackway, a kerf cutting mechanism having a vertical kerf cutter for cutting a vertical kerf at one side of said trackway, means for pivotally mounting said kerf cutting mechanism on said base to tilt about a horizontal axis extending longitudinally of said base, said kerf cutting mechanism also including a motor and feeding means actuated by said motor for bodily feeding said base and mechanism, and means for swinging said kerf cutting mechanism about its pivotal axis relative to said base to tilt said kerf cutter with respect to the vertical.

19. In a mining apparatus, a support movable along a trackway, a kerf cutting machine supported on said support for tilting movement about an axis extending longitudinally of said support and having a vertical kerf cutter for cutting a vertical kerf at one side of said trackway, said machine also having a motor for actuating said kerf cutter to effect cutting, and feeding means operated by said motor for bodily feeding the machine, and means extending between said support and said kerf cutting machine for tilting said kerf cutter with respect to the vertical.

20. In a mining apparatus, a support movable along a trackway, a kerf cutting machine supported on said support upon one edge thereof, said kerf cutting machine having a vertically swingable bar for cutting a vertical kerf at one side of said trackway, and means supported by said kerf cutting machine for retarding downward swinging of said bar including a braking device supported upon the top of said cutting machine and flexibly connected to said bar.

JOSEPH F. JOY.